United States Patent [19]
Simpson, Jr.

[11] 3,710,820
[45] Jan. 16, 1973

[54] FLUID FLOW REGULATOR VALVE
[75] Inventor: William E. Simpson, Jr., Chambles, Ga.
[73] Assignee: Rockhead Aircraft Corporation, Burbank, Calif.
[22] Filed: Aug. 11, 1971
[21] Appl. No.: 170,794

[52] U.S. Cl. ...............137/495, 137/504, 91/189
[51] Int. Cl. .................................................F16k 31/12
[58] Field of Search .................137/495, 504; 91/189

[56] References Cited

UNITED STATES PATENTS

| | | | |
|---|---|---|---|
| 2,500,883 | 3/1950 | Stone | 137/495 |
| 2,693,810 | 11/1954 | McFarland | 137/495 X |
| 2,967,485 | 1/1961 | Towler et al | 91/189 X |
| 3,285,282 | 11/1966 | Martin | 137/504 X |

Primary Examiner—Henry T. Klinksiek
Assistant Examiner—Robert J. Miller
Attorney—John J. Sullivan et al.

[57] ABSTRACT

Incorporated into a hydraulic flow regulator are features which cause a hydraulic motor or actuator to run at a fraction of normal speed while unloaded and at the normal speed while loaded. These features consist essentially of a spring-loaded spool or piston in the flow regulator which blocks all except the fractional flow passages when the motor or actuator is pushing against low resistance. WHen the resistance encountered by the motor or actuator exceeds a predetermined level, the resulting hydraulic back pressure moves the piston or spool so that the normal flow passages in the flow regulator are uncovered, thus permitting operation at normal speed.

6 Claims, 1 Drawing Figure

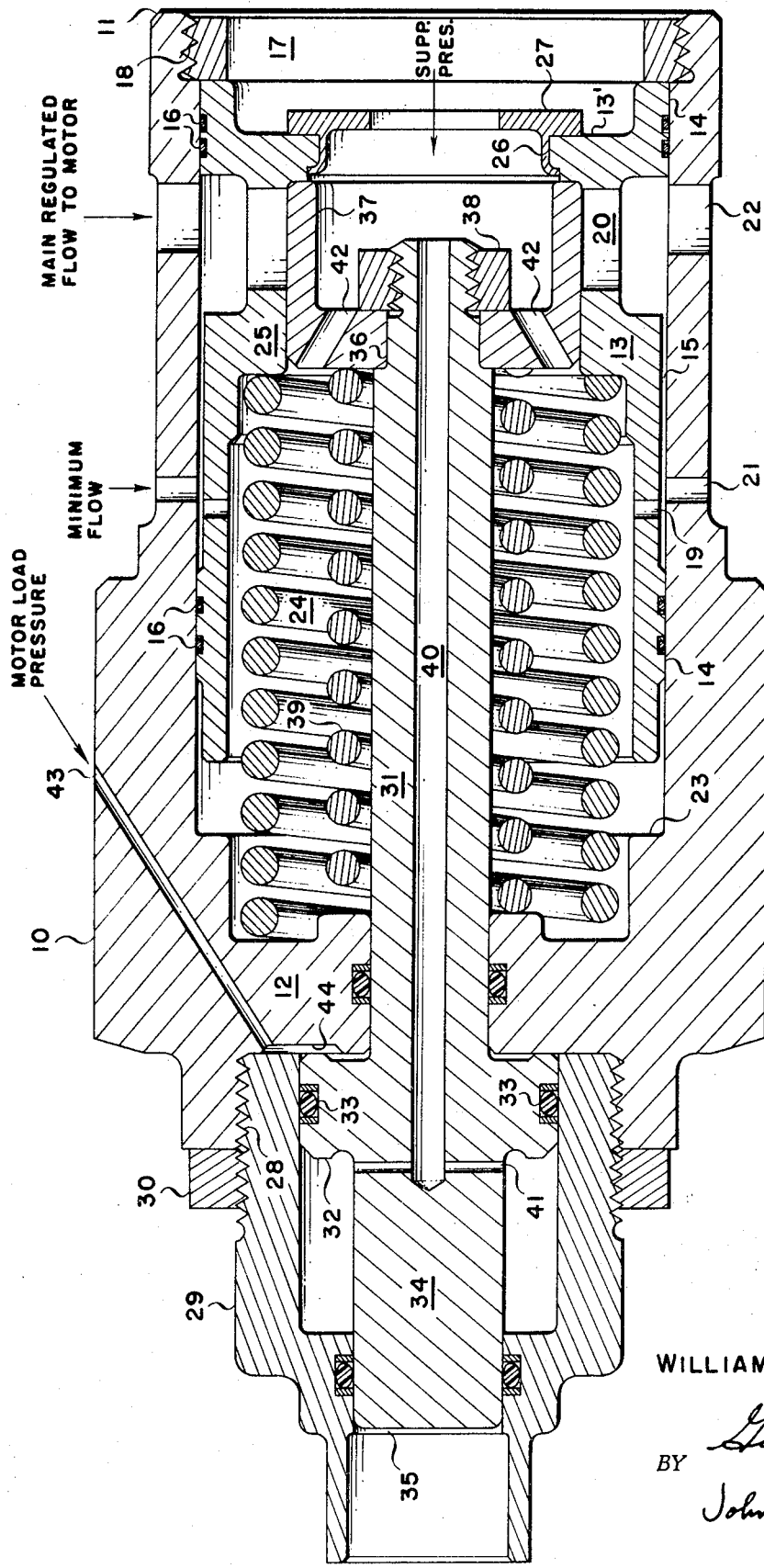

FLUID FLOW REGULATOR VALVE

This invention relates to fluid regulators generally, and more particularly to a fluid flow regulator valve to vary the flow rate corresponding to different downstream pressures.

While the present invention is applicable generally to the regulation of all fluid, it has especial utility in connection with hydraulic fluid as employed in motors and actuators whether of the linear or rotary type. For example, hydraulic motors in power transfer units are being damaged by violent motor acceleration that occurs during start-up. This is largely because present hydraulic flow regulators allow the hydraulic motor or actuator to accelerate to normal or full speed before picking up its load.

In some instances such as the motor side of a hydraulic power transfer unit, the acceleration on start-up is sufficiently violent to damage the motor. Moreover, if fluid for any reason is lost in the driven hydraulic system so that the motor in the driving hydraulic system becomes unloaded, the power transfer unit controlled by a conventional flow regulator runs at maximum speed with the flow regulator passing the motor horsepower into the driving system in the form of heat.

The instant invention proposes to overcome the foregoing objections by incorporating additional features into a hydraulic flow regulator so as to control the velocity of the fluid flow to the associated motor. In this way the fluid is made to shift from one velocity to another corresponding to loads imposed on the associated motor. Moreover, this velocity shift is completely automatic in direct response to the motor or actuator load.

More specifically, the hydraulic fluid flow regulator valve herein contemplated includes a reciprocable core exposed to supply fluid pressure so that such pressure retains it in a position to permit porting of a predetermined fluid flow to the associated motor. This predetermined flow is at a minimum velocity corresponding to the inoperative condition of the associated motor or actuator. This valve includes a port for the interconnection thereto of a fluid pressure line from the motor or actuator to the core in opposition to the supply fluid pressure. Thus, when the motor commences operation this back fluid pressure is developed to act on the core against the supply fluid pressure. When such opposing pressure from the motor overcomes the supply pressure, the core is moved or driven thereby to a second position of predetermined higher velocity fluid flow to the motor or actuator. This greater velocity corresponds to the fully operative condition of the actuator, i.e., the actuator under full load.

With the above and other objects in view as will be apparent, this invention consists in the construction, combination and arrangement of parts, all as hereinafter more fully described, claimed and illustrated in the accompanying drawing wherein there is shown a longitudinal section taken through a fluid flow regulator valve designed and constructed in accordance with the teachings hereof to show the reciprocable core with piston and the communication channels for the supply fluid pressure and opposing motor operation pressure to act on opposite faces thereof as well as the alternative ports for the passage of different flow rates through the valve to the motor or actuator as determined by the dominant pressure.

Referring more particularly to the drawing, 10 designates the valve housing or case which is generally hollow being open as at 11 at one end and closed by a wall 12 at the other end. Seated within the case 10 is a reciprocable sleeve 13 which is formed or otherwise provided with a peripheral surface 14 adjacent each end. These surfaces 14 define an overall diameter substantially equal to the internal diameter of the case 10 so as to act as bearing surfaces facilitating reciprocation of the sleeve 13 therein. At the same time a space 15 is established between the adjacent walls of the case 10 and sleeve 13 between the surfaces 14. Following conventional practice, appropriate dynamic seals 16 are associated with each surface 14.

The sleeve 13 is retained within the case 10 by means of and through a lock ring 17 or the equivalent. To this end, the inner peripheral, marginal edge of the case 10 is threaded as at 18 for locking coaction with complementary threads on the lock ring 17. The length of the sleeve 13 is established so as to permit its predetermined reciprocation within the case 10. Spaced ports 19 and 20 pierce the wall of the sleeve 13 between the surfaces 14 and communicate with the space 15 and with similar spaced ports 21 and 22 piercing the wall of the case 10. Sleeve 13 reciprocation in case 10 is limited by a radially, inwardly extending shoulder 23 on the inner case wall adjacent the end 12 acting in opposition to the lock ring 17 at the open case end 11.

When the sleeve 13 is located with its edge abutting the locking ring 17, minimum flow ports 19 and 21 are at least in partial alignment while ports 20 and 22 are in total alignment which is assured by substantially oversizing one of the ports, for example the port 20. On the other hand, when the sleeve 13 is located with its edge abutting the shoulder 23, none of the ports 19, 20, 21, and 22 align. At this time, the surface 14 proximate the open case end 11 aligns with and thereby blocks the port 22, while the space 15 serves to permit communication between the sleeve ports 19 and 20 and the case port 21.

The normal position of the sleeve 13 is pre-established to be at the open end 11 of the case 10, i.e., with the end of the sleeve 13 abutting the lock ring 17. This is accomplished by a compression spring 24 mounted internally of the sleeve 13 with one end against the case wall 12 and the other end against a radially, inwardly extending collar 25 on the sleeve 13 adjacent its remote or outer end 13'.

The sleeve and 13' defines a central aperture 26 of predetermined size matched to the size of the port 22 in case 10 as varied with respect to effective transverse dimension by the bearing surface 14 upon reciprocation of the sleeve 13 as described. Preferably, the effective dimension of the aperture 26 is established by means of and through the use of an orificed plate 27 removably secured therein. To permit this, the aperture 26 is oversized. The plate 27 may thereby be readily changed and/or replaced.

In view of the foregoing construction, supply fluid pressure may enter the valve 10 through the orificed plate 27 and build to a point where it can force the sleeve 13 inwardly of the case 10. The outer bearing surface 14 on the sleeve 13 is thereby made to overlap port 22 reducing the effective transverse dimension thereof. Thus, the supply fluid pressure to the associated motor is regulated and/or maintained at the desired rate.

Conversely as the supply fluid pressure drops, the sleeve 13 moves under the action of its spring 24 toward the lock ring 17 opening port 22, eventually for maximum fluid flow rate to the motor. This is more or less standard operation with fluid regulators. The additional structure incorporated into the valve 10 as contemplated herein permits the supplemental operation necessary to produce multiple flow rates to the motor.

To this end the case wall 12 is recessed and threaded as at 28 to receive an externally threaded cap 29 on which a lock nut 30 is threaded into abutment against the end face of the wall 12 whereby the cap 29 is immovably secured to the case 10. The case wall 12 is pierced centrally in the base of the recess 28 to provide a passage for the shank 31 of a piston 32 which passes therethrough. The piston 32 is, in effect, integrally formed on the shank 31 and disposed internally of the cap 29, being formed to a diameter substantially equal to the internal diameter of the cap 29 so as to be disposed therein in abutment. Dynamic seals 33 are provided in the peripheral surface of the piston 32.

An extension 34 projects from the side of the piston 32 opposite the shank 31 and passes through an opening 35 in the end wall of the cap 29 provided therefor. The extension 34 is in sliding relation with the adjacent cap wall, and dynamic seals equivalent in all respects to the seals 33 are incorporated in the end wall of the cap 29 to prevent fluid leakage.

At its remote end, the shank 31 terminates internally of the sleeve 13 in a reduced end portion 36 on which a cup 37 is mounted. The cup 37 opens in an outward direction, i.e., away from the shank 31, and the reduced end portion 36 is threaded to receive a nut 38 by which the cup 37 is retained in a fixed position thereon. The external diameter of the cup 37 is substantially equal to that of the adjacent portion of the sleeve 13 so as to abut and act in sliding cooperation therewith. The length of the cup 37 is substantially equal to the distance between the outer side of the piston 32 and the facing, base wall of the cap 29 when abutting the case wall 12 for reasons to become more apparent.

A compression spring 39 encircles the shank 31 within the sleeve 13 and case 10 abutting the case end wall 12 at one end and the base of the cup 37 at the other end. Thus, under normal action of this spring 39 the cup 37 is maintained against the sleeve outer end 13' with the inner side of the piston 32 abutting the base wall of the case recess 28.

An axial bore 40 pierces the shank 31 extending from the reduced end 36 thereof to the outer side of the piston 32. A transverse bore 41 pierces the extension 34 so as to intersect the end of the axial bore 40 whereby to establish communication between the bore 40 and the interior of the cap 29 between the piston head 32 and the extension 34.

A selected number of discrete passages 42 pierce the base wall of the cup 37 to permit fluid flow into the area defined by the sleeve 13, shank 31, case wall 12, and the cup 37 where it may pass through the port 19, space 15 and case ports 21 and 22 (when not blocked by sleeve surface 14) to the associated motor. A separate passage 43 is provided in the case 10 adapted to be connected by appropriate fluid lines (not shown) to the motor or actuator. At its inner end, this passage 43 pierces the case wall 12 where it opens in the base of recess 28 and is in communication with the inner side of the piston 32. To assure this, a groove 44 is provided in the surface of the wall 12 forming the base of the recess 28 adjacent and in communication with the inner end of the passage 43.

In view of the foregoing additional construction and arrangement, the supplemental operation of the valve 10 as herein proposed becomes possible. When fluid supply pressure enters the orificed plate 27, it passes simultaneously through the axial bore 40 in the shank 31 and through the passages 42 in the cup 37, through the port 19, space 15 and ports 21 and 22 into the associated motor. The flow through the axial bore 40 passes through the transverse bore 41 into the cap 29 where it acts against the outer side of piston 32. The piston 32 is thereby moved or tends to move in the direction where the cup 37 overlies port 20 blocking fluid flow from supply through orificed plate 27 to the port 22, space 15 and port 21. This movement or tendency of the piston 32 is supplemented by the action of the compression spring 39 on and against the cup 37.

The operation of the valve 10 at this time corresponds to minimum fluid flow to the associated motor and this continues so long as the associated actuator or motor is idle. Upon commencement of operation of the motor, however, a back pressure develops which is transmitted through the associated line into the case passage 43. Fluid pressure is thereby applied to the inner side of piston head 32 to act in opposition to the supply fluid pressure on the opposite side of the piston head 32. When this back pressure builds to a point where it exceeds the supply pressure fluid pressure plus the biasing effect of the spring 39, the piston 32 moves in the opposite direction carrying with it the cup 37. Thus, port 22 is gradually open admitting supply pressure fluid therethrough and into the motor. Eventually, port 22 is fully opened and the motor at this time is operating under full load.

When operation of the motor or actuator subsequently ceases, the back pressure fluid in the case passage 43 ceases to act on the inner side of the piston head 32. The supply pressure fluid acting on the outer side of the piston head 32 together with the normal action of the spring 39 now causes the piston 32 to be returned to its original position whereby the cup 37 overlies port 20. Further fluid flow to the motor through ports 20 and 22 now ceases and continued supply pressure passes through port 19 as before. Unless and until operation of the actuator or motor again occurs, accompanying a load thereon, and a reoccurrence of back pressure becomes effective, minimum fluid flows to the motor.

While the invention has hereinabove been illustrated and described in what is presently believed to be its best embodiment, other forms may be desirable in specific applications. Such variations are envisioned as would be apparent to those skilled in the art applying the variable fluid flow rate concept as herein proposed.

What is claimed is:

1. A fluid flow regulator valve comprising:
   a hollow housing having multiple, spaced ports of different sizes in the side wall thereof;
   a reciprocable core mounted within said housing, said core including a relatively movable sleeve pierced by apertures corresponding in number, size and location to the housing ports aforesaid, a plurality of spaced, interconnected pistons mounted for relative movement within said sleeve, and biasing means operative on said core tending to dispose and maintain it in a position with said sleeve apertures in alignment with said housing ports and said pistons in predetermined position blocking fluid flow through the larger of said apertures and ports to thereby limit fluid flow through said valve to the smaller of said apertures and ports; and a fluid passage in said housing for the flow of fluid on and against said pistons in opposition to said biasing means to thereby move them out of the blocking position aforesaid.

2. The regulator valve of claim 1 wherein said biasing means includes a pair of substantially coextensive compression springs one operative between said housing and said sleeve and the other operative between said housing and said pistons whereby the relative movement of said sleeve and said pistons aforesaid is linear.

3. The valve of claim 2 wherein said housing includes two series of ports and said sleeve includes two series of apertures, the ports and the apertures in each series being aligned.

4. The valve of claim 2 wherein said core further includes a second fluid passage communicating with one side of said pistons for operation of fluid thereon in a direction to supplement said biasing means.

5. The regulator valve of claim 1 wherein said housing is open at one end and including an orificed plate removably mounted in said open end.

6. The valve of claim 5 wherein said housing is closed at its other end and including a fluid chamber removably secured to and extending from said closed end, one of said pistons being disposed in said chamber and connected to a second piston disposed in said housing by a stem piercing said closed end, a fluid passage piercing said second piston and said stem for communication between said open housing end and the interior of said chamber.

* * * * *